(12) United States Patent
Vaduvatha et al.

(10) Patent No.: US 8,813,015 B2
(45) Date of Patent: Aug. 19, 2014

(54) FLEXIBLE PIN ALLOCATION

(71) Applicant: Juniper Networks, Inc., Sunnyvale, CA (US)

(72) Inventors: Srinivas Vaduvatha, Santa Clara, CA (US); Srinivas Venkataraman, Santa Clara, CA (US); Anurag P. Gupta, Saratoga, CA (US); Praveen Garapally, Fremont, CA (US); Norman Bristol, Westford, MA (US); Dibyendu Sen, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 13/725,215

(22) Filed: Dec. 21, 2012

(65) Prior Publication Data

US 2013/0111156 A1    May 2, 2013

Related U.S. Application Data

(63) Continuation of application No. 12/983,024, filed on Dec. 31, 2010, now Pat. No. 8,341,584.

(51) Int. Cl.
*G06F 17/50* (2006.01)
*G06F 12/00* (2006.01)
*G06F 13/40* (2006.01)

(52) U.S. Cl.
CPC .............. *G06F 12/00* (2013.01); *G06F 13/409* (2013.01)
USPC ........................................................ 716/122

(58) Field of Classification Search
USPC .................................................. 716/154, 122
See application file for complete search history.

(56) References Cited

U.S. PATENT DOCUMENTS

| | | | |
|---|---|---|---|
| 4,675,673 A * | 6/1987 | Oliver ...................... | 324/755.11 |
| 5,231,589 A | 7/1993 | Itoh et al. | |
| 5,303,180 A | 4/1994 | McAdams | |
| 5,317,211 A | 5/1994 | Tang et al. | |
| 5,511,182 A | 4/1996 | Le et al. | |
| 6,138,177 A | 10/2000 | Williams et al. | |
| 6,577,157 B1 | 6/2003 | Cheung et al. | |
| 7,082,071 B2 * | 7/2006 | Knaack et al. ................ | 365/221 |
| 7,159,061 B2 | 1/2007 | Khan et al. | |
| 7,577,933 B1 * | 8/2009 | Wu et al. ....................... | 716/119 |
| 8,341,584 B1 | 12/2012 | Vaduvatha et al. | |
| 2005/0018514 A1 * | 1/2005 | Knaack et al. ................ | 365/221 |
| 2007/0014140 A1 * | 1/2007 | Telecco et al. ................... | 365/63 |
| 2008/0031076 A1 * | 2/2008 | Bartley et al. ............ | 365/230.03 |
| 2009/0204731 A1 * | 8/2009 | Mulligan et al. ................ | 710/20 |
| 2010/0191911 A1 | 7/2010 | Heddes et al. | |
| 2010/0205490 A1 * | 8/2010 | Louie et al. ................... | 714/718 |

* cited by examiner

*Primary Examiner* — Jack Chiang
*Assistant Examiner* — Mohammed Alam
(74) *Attorney, Agent, or Firm* — Harrity & Harrity, LLP (57) ABSTRACT

A system includes a memory and a controller. The controller may include a group of pads and an allocation register. The controller is configured to receive input signals corresponding to the group and allocate each one of the pads to output one of the input signals based on a configuration of pins of the memory. The controller is also configured to redirect the input signals, within the controller, based on the allocation of the pads and output the input signals from the controller into the pads.

20 Claims, 5 Drawing Sheets

FLEXIBLE PIN ALLOCATION

RELATED APPLICATION

This application is a continuation of U.S. patent application Ser. No. 12/983,024 (now U.S. Pat. No. 8,341,584), filed Dec. 31, 2010, the disclosure of which is incorporated herein by reference.

BACKGROUND

Random access memory (RAM) is a type of storage for computing devices. RAM is typically associated with volatile memory that is implemented in integrated circuits and in which stored information is lost when power provided to the RAM is switched off.

One type of RAM is known as double-data-rate synchronous dynamic random access memory (DDR SDRAM). DDR SDRAM is typically used in computing applications that require high bandwidth and low latency memory access. One version of this memory technology is known as DDR3 SDRAM, which can provide for high performance data rates, high bandwidth, high density, and low power consumption relative to earlier generations of SDRAM.

The high bandwidth and high operating frequencies required to drive DDR SDRAM can be problematic as they can make the controller to memory interface electrically complex due to signal integrity considerations. A DDR3 SDRAM controller (herein, "controller") needs to transmit signals to associated DDR3 SDRAM memory (herein, "memory") for the operation of the memory on a printed circuit board ("PCB") (herein, "board"). The memory includes multiple pins. Each one of the pins of the memory receives a specific type of information (e.g., a bit of an address, reset instruction, etc). The controller is physically designed to include pads that individually correspond to one of the pins. Herein, any reference to pin(s) or pad(s) may refer to a same type of physical components. Each one of the pads may transmit a signal for a specific type of information to a corresponding pin of the memory. In other words, each pin of a memory is driven by an equivalent pad of a controller.

A controller may be used for different types of memory that have different configuration of pins. Often, different controllers need to be used for different instances of a same type of memory based on where each one of the instances is placed on a board (i.e., board layout). For the physical design of the controller to be reused, physical connections need to be fixed between pins of the memory and corresponding pads of the controller. As a result, crossovers occur and additional layers may need to be added to the board to accommodate tight skew requirements of the high bandwidth, further increasing routing complexity on the board and signal routing congestion. The problems associated with reusing a particular controller for different types of memory, or for different instances of a same type of memory with different board layouts, make the practice, currently, practically impossible.

A physical design of a controller may be tailored for each type of board (e.g., each memory device). A controller tailored for a particular physical design of memory may not be used with memory devices that have different configurations of pins. In other words, a controller with a particular physical design may only be used for a particular type of memory. Accordingly, a single controller cannot be used with multiple devices that have different physical configurations. This solution is inefficient, non-scalable, and requires a fixed layout for every board using a particular controller. Forcing boards to have the same type of layout for the boards to interact with a particular controller impedes placement of memory and routing optimization.

SUMMARY

According to one aspect, a method may include: receiving, by a controller, layout information; generating, by the controller, an allocation table based on the layout information; programming, by the controller, a register corresponding to a pad based on the allocation table; and outputting, by the controller, a particular signal from the pad of the controller to a pin of a memory device by using a value of the register. The allocation table may ensure that a signal is transmitted from the pad to the pin that is connected to the pad.

According to another aspect, a non-transitory computer-readable medium may store a program for causing a computer to perform a method. The method may include: receiving input signals corresponding to a group of pads; inputting the input signals into each one of a plurality of multiplexers; and outputting the input signals from the pads based on outputs of the multiplexers. A quantity of the multiplexers may equal a quantity of the input signals and each one of the multiplexers may correspond to a different one of the pads. One or more of the pads may connect one or more pins of a memory device without crossovers.

According to yet another aspect, a system may include a memory and a controller. The memory may include pins. The controller may include a group of pads and an allocation register. One of the pads may connect to one of the pins via a connection that does not crossover a connection of another one of the pads and another one of the pins. The allocation register may: receive input signals corresponding to the group; allocate each one of the pads to output one of the input signals based on a configuration of the pins; redirect the input signals within the allocation register based on the allocation of the pads; and output the input signals from the allocation register into the pads.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation, described herein, may provide for flexible allocation of pads of a memory controller. The memory controller may receive information about a layout of a board. The information may include a type of the configuration of pins of a memory device on the board. The memory controller may generate an allocation table based on the type of the configuration. The memory controller may populate the allocation table for pads of the memory controller to correspond, mutually exclusively, to pins of the memory device. The memory controller may program registers based on the allocation table and store the registers in the allocation table.

The memory controller may receive signals. Each pad may be associated with a multiplexer. A quantity of multiplexers may equal a quantity of the signals. Each one of the multiplexers may receive each one of the signals as an input. A multiplexer may also receive a value of one of the registers, from the allocation table, as a selector input. The multiplexer may select one of the signals based on a value of the selector input. The multiplexer may output the selected signal into the multiplexer's associated pad. The pad may transmit the signal to a corresponding pin of the memory device that is associated with the pad in the allocation table. The memory device may receive the signal via the corresponding pin. The memory device may perform an operation (e.g., set control information, write data into the memory based on data mask information, etc.) based on the signal and/or one or more other signals received through other pins of the memory device.

Figure 1:
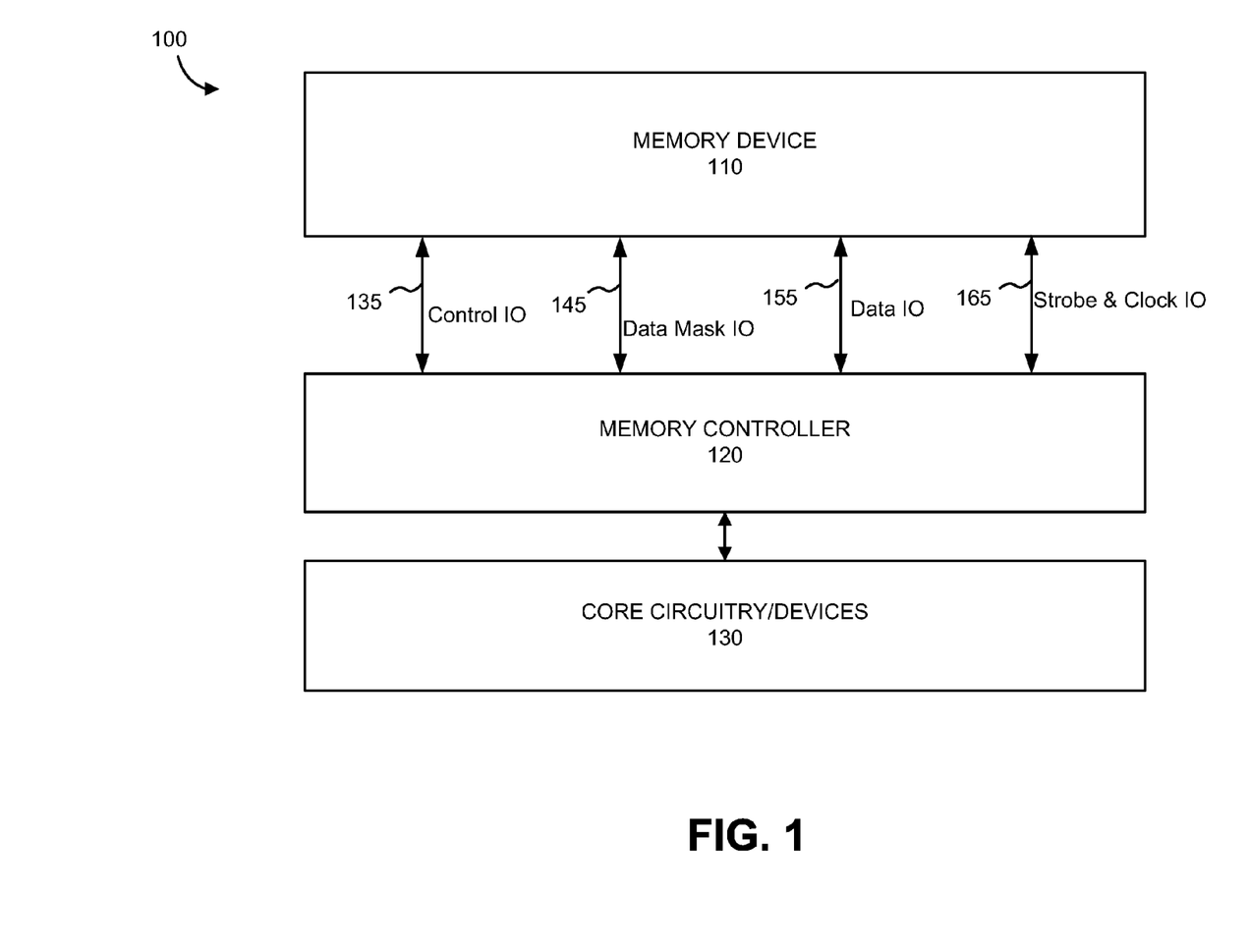
FIG. 1 is a diagram of an example system according to an implementation described herein.

FIG. 1 is a diagram of an example system 100 according to an implementation described herein. System 100 may include or be a part of a computing device that incorporates random access memory, such as DDR3 SDRAM. For instance, system 100 may include an application specific integrated circuit (ASIC), a field-programmable gate array (FPGA), or a board that is designed to perform various functions. For example, system 100 may embody or be a part of a network device, such as a router, a switch, a gateway, etc. System 100 may include one or more components or devices that need access to a fast random access memory.

As shown in FIG. 1, system 100 may include one or more of the following elements: a memory device 110, a memory controller 120, and core circuitry/devices 130. Memory device 110 may include, for example, a memory, such as a DDR3 SDRAM memory. In another implementation, memory device 110 may include another form of RAM. Memory device 110 may be directly connected to memory controller 120. In another implementation, a memory module may be implemented using memory device 110 and one or more other memory devices. The memory module may include memory device 110 and the one or more other memory devices.

Memory controller 120 may be a part of an ASIC. Memory controller 120 may read and write data to or from memory device 110 and generally control the operation of memory device 110 by using control input/output (IO) lines 135, data mask IO lines 145, data (DQ) IO lines 155, and strobe (DQS) and clock IO lines 165 (collectively, lines 135, 145, 155, 165). Memory controller 120 may connect to memory device 110 and/or one or more other memory devices.

An individual line, of lines 135, 145, 155, 165, may be formed by transmitting a signal from a pad of memory controller 120 to a pin of memory device 110. Memory device 110 may include multiple pins that need to be driven by memory controller 120 using lines 135, 145, 155, 165. Memory controller 120 may include pads that correspond to the pins. In one implementation, each pin and pad may be part of (segregated into) a group that corresponds to one of lines 135, 145, 155, 165 based on a type of the signal received by the pin.

For example, a group for control IO interface pins corresponding to control IO lines 135 may include: 16 pins for an Address, 3 pins for a Bank, 1 pin for Clock Enable, 1 pin for Reset, 1 pin for Row Address Strobe (RAS), 1 pin for Column Address Strobe (CAS), 1 pin for Write Enable (WE), 1 pin for On-Die Termination (ODT), and 1 pin for Chip Select (CS). A group of data mask IO interface pins, corresponding to data mask IO lines 145, may include: 2 pins, for data mask IO (signals), when memory device 110 has an X16 data interface (16 of bits per chip) or 1 pin, for data mask signals, when memory device 110 has an X4 data interface or an X8 data interface. Data mask signals may provide instructions for writing data received via data IO lines 155. A group of data IO interface pins corresponding to data IO lines 155 may include, for data IO (signals): 16 pins when memory device 110 has an X16 data interface, 8 pins when memory device 110 has an X8 data interface, or 4 pins when memory device 110 has an X4 data interface. A group of strobe and clock IO interface pins, corresponding to strobe and clock IO lines 165, may include: 2 differential pins for Clock signals and 4 differential pins for strobe signals when memory device 110 has an X16 data interface or 2 differential interface pins for strobe signals when memory device 110 has an X4 data interface or an X8 data interface. Strobe and clock IO (signals) may include strobes (e.g., DQSL, DQSL#, DQSU), termination data strobes (e.g., TDQS, TDQS#, TDQS), and clock signals (CK/CK#). Memory device 110 may perform read and write operations synchronously based on a periodic signal transmitted over strobe lines of strobe and clock IO lines 165. While a particular quantity and arrangement of pins has been described, in another implementation, memory device 110 may include fewer pins, additional pins, different pins, or differently arranged pins.

Pads may also be grouped into one of, for example, control IO pads, data mask IO pads, data IO pads, or strobe and clock IO pads. The pads groups may correspond to the pins groups that are described above. The flexible allocation of pads may occur within each one of the pads groups of control IO pads, data mask IO pads, and/or data IO pads. Memory controller 120 may allocate each pad to a particular signal in a mutually exclusive manner (i.e., only one pad may be allocated to the particular signal). For example, memory controller 120 may allocate a pad in the control IO pads group to an RAS signal. Memory controller 120 may not allocate any other pad to the RAS signal.

Core circuitry/devices 130 may include specialized circuits, general purpose processors or microprocessors, or other computing devices that connect to memory controller 120. Through memory controller 120, core circuitry/devices 130 may access memory device 110. Memory controller 120 may receive signals (e.g., data) from core circuitry/devices 130.

Each one of memory device 110, memory controller 120, and core circuitry/devices 130 may include, be a part of, or be connected to a device that may perform certain operations, as described in detail below. The device may perform these operations in response to a processor executing software instructions (e.g., computer program(s)) contained in a computer-readable medium, a secondary storage device (e.g., hard disk, CD-ROM, etc.), or other forms of RAM or ROM. A computer-readable medium may be defined as a non-transitory memory device. A memory device may include memory space within a single physical memory device or spread across multiple physical memory devices. Alternatively, hardwired circuitry may be used in place of or in combination with software instructions to implement processes described herein. Thus, implementations described herein are not limited to any specific combination of hardware circuitry and software.

Figure 2:
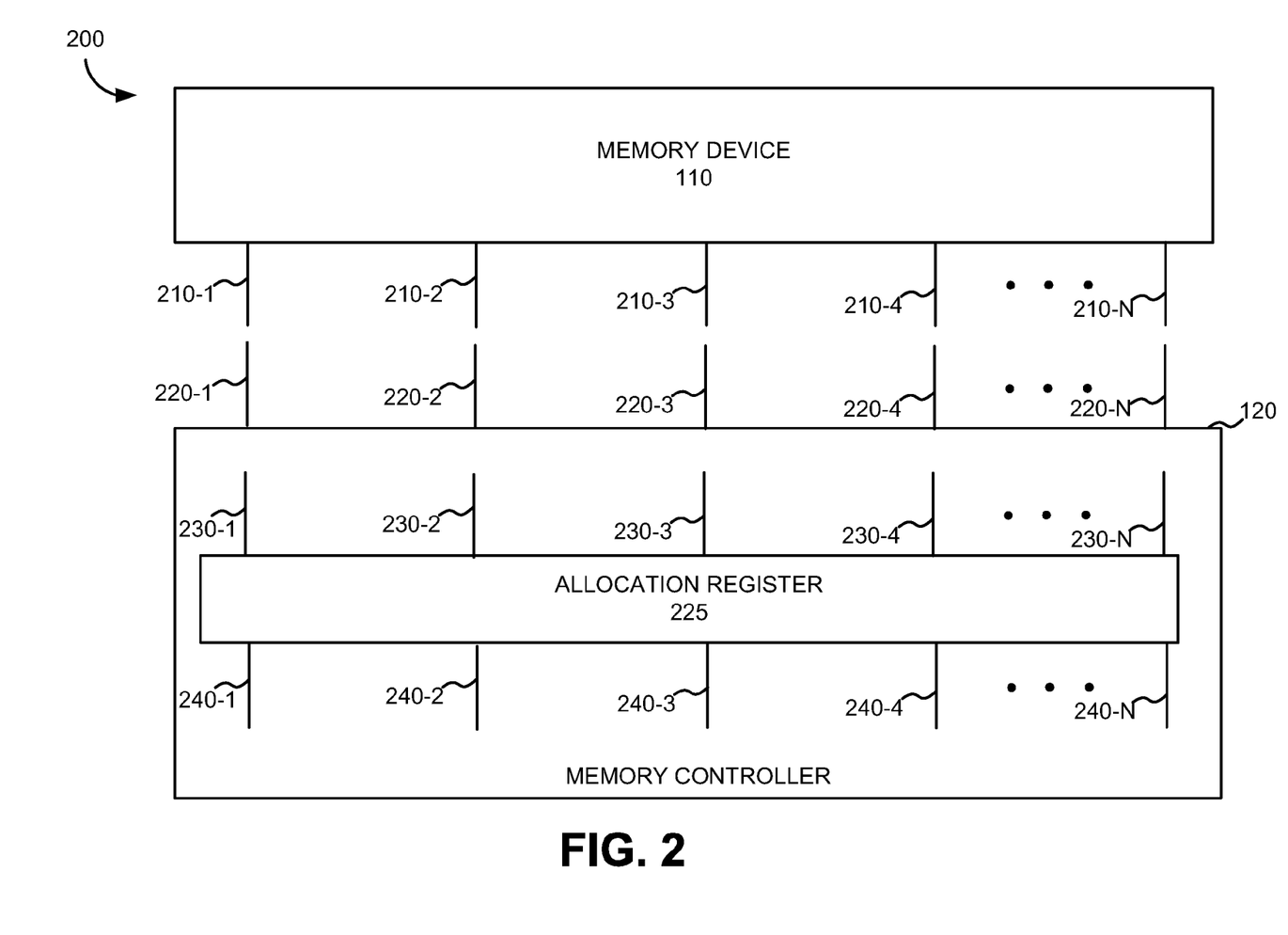
FIG. 2 is a diagram of an example part of the example system show in FIG. 1.

FIG. 2 is a diagram of an example part 200 of system 100. Part 200, as shown in FIG. 2, may include memory device 110 and memory controller 120. Memory device 110 may include pins 210-1, 210-2, 210-3, 210-4, . . . , 210-N (referred to collectively as "pins 210" and individually as "pin 210") for receiving signals from memory controller 120. For example, pins 210-1, 210-2, 210-3, 210-4 may be part of a group of the control IO interface pins (herein, "control pins 210"). For example, a configuration (e.g., physical design) of memory device 110 may specify for pin 210-1 to receive a WE signal, for pin 210-2 to receive a CAS signal, for pin 210-3 to receive a RAS signal, for pin 210-4 to receive a CS signal, etc.

Memory controller 120 may include pads 220-1, 220-2, 220-3, 220-4, . . . , 220-N (referred to collectively as "pads 220" and individually as "pad 220") for transmitting signals to memory device 110. A board (that includes memory device 110 and memory controller 120) may physically position pad 220-1 directly across from pin 210-1, pad 220-2 directly across from pin 210-2, pad 220-3 directly across from pin 210-3, pad 220-4 directly across from pin 210-4, etc. For example, pads 220-1, 220-2, 220-3, 220-4 may be part of a group of control pads (herein, "control pads 220"), and memory controller 120 may use pads 220-1, 220-2, 220-3, 220-4 to transmit control signals from memory controller 120 to the control pins of memory device 110.

Memory controller 120 may also include a programmable pin allocation register 225 (herein, "allocation register 225"). Allocation register 225 may output signals 230-1, 230-2, 230-3, 230-4, . . . , 230-N (referred to collectively as "output signals 230" and individually as "output signal 230"). Allocation register 225 may receive input signals 240-1, 240-2, 240-3, 240-4, . . . , 240-N (referred to collectively as "input signals 240" and individually as "input signal 240"). Allocation register 225 may redirect input signals 240 to output as output signals 230 by using multiplexers corresponding to each one of pads 220, as described further below in reference to FIG. 3. Allocation register 225 may register input signals 240 before using the multiplexers and register output signals 230 after using the multiplexers in order to meet internal timing paths of an ASIC that includes memory controller 120.

For example, allocation register 225 may determine which one of pads 220, in the control pads group, outputs what control signal. Allocation register 225 may receive a CS signal as input signal 240-1. Allocation register 225 may use a multiplexer to output the CS signal as output signal 230-4. Pad 220-4 may receive output signal 230-4, the CS signal, out of the multiplexer. Pad 220-4 may transmit the CS signal directly across to pin 210-4 of memory device 110. As described above, pin 210-4 may be configured to receive the CS signal. Pad 220-4 is physically located directly across from pin 210-4. As a result, no crossover is necessary to connect one of pins 210 of memory device 110 and one of pads 220 of memory controller 120 in order to transmit the CS signal from pad 220-4 to pin 210-4.

Allocation register 225 may receive a RAS signal as input signal 240-2. Allocation register 225 may use a multiplexer to output the RAS signal as output signal 230-3. Pad 220-3 may receive output signal 230-3, the RAS signal, out of the multiplexer. Pad 220-3 may transmit the RAS signal directly across to pin 210-3 of memory device 110. As described above, pin 210-3 may be configured to receive the RAS signal. Pad 220-3 is physically located directly across from pin 210-3. As a result, no crossover is necessary to connect one of pins 210 of memory device 110 and one of pads 220 of memory controller 120 in order to transmit the RAS signal from pad 220-3 to pin 210-3.

Allocation register 225 may receive a CAS signal as input signal 240-3. Allocation register 225 may use a multiplexer to output the CAS signal as output signal 230-2. Pad 220-2 may receive output signal 230-2, the CAS signal, out of the multiplexer. Pad 220-2 may transmit the CAS signal directly across to pin 210-2 of memory device 110. As described above, pin 210-2 may be configured to receive the CAS signal. Pad 220-2 is physically located directly across from pin 210-2. As a result, no crossover is necessary to connect one of pins 210 of memory device 110 and one of pads 220 of memory controller 120 in order to transmit the CAS signal from pad 220-2 to pin 210-2.

Allocation register 225 may receive a WE signal as input signal 240-4. Allocation register 225 may use a multiplexer to output the WE signal as output signal 230-1. Pad 220-1 may receive output signal 230-1, the WE signal, out of the multiplexer. Pad 220-1 may transmit the WE signal directly across to pin 210-1 of memory device 110. As described above, pin 210-1 may be configured to receive the WE signal. Pad 220-1 is physically located directly across from pin 210-1. As a result, no crossover is necessary to connect one of pins 210 of memory device 110 and one of pads 220 of memory controller 120 in order to transmit the WE signal from pad 220-1 to pin 210-1. Accordingly, implementations herein may reduce a number of crossovers that occur by connecting memory device 110 and memory controller 120. Reducing the number of crossovers may reduce the number of PCB layers that are necessary to connect memory device 110 and memory controller 120.

Figure 3:
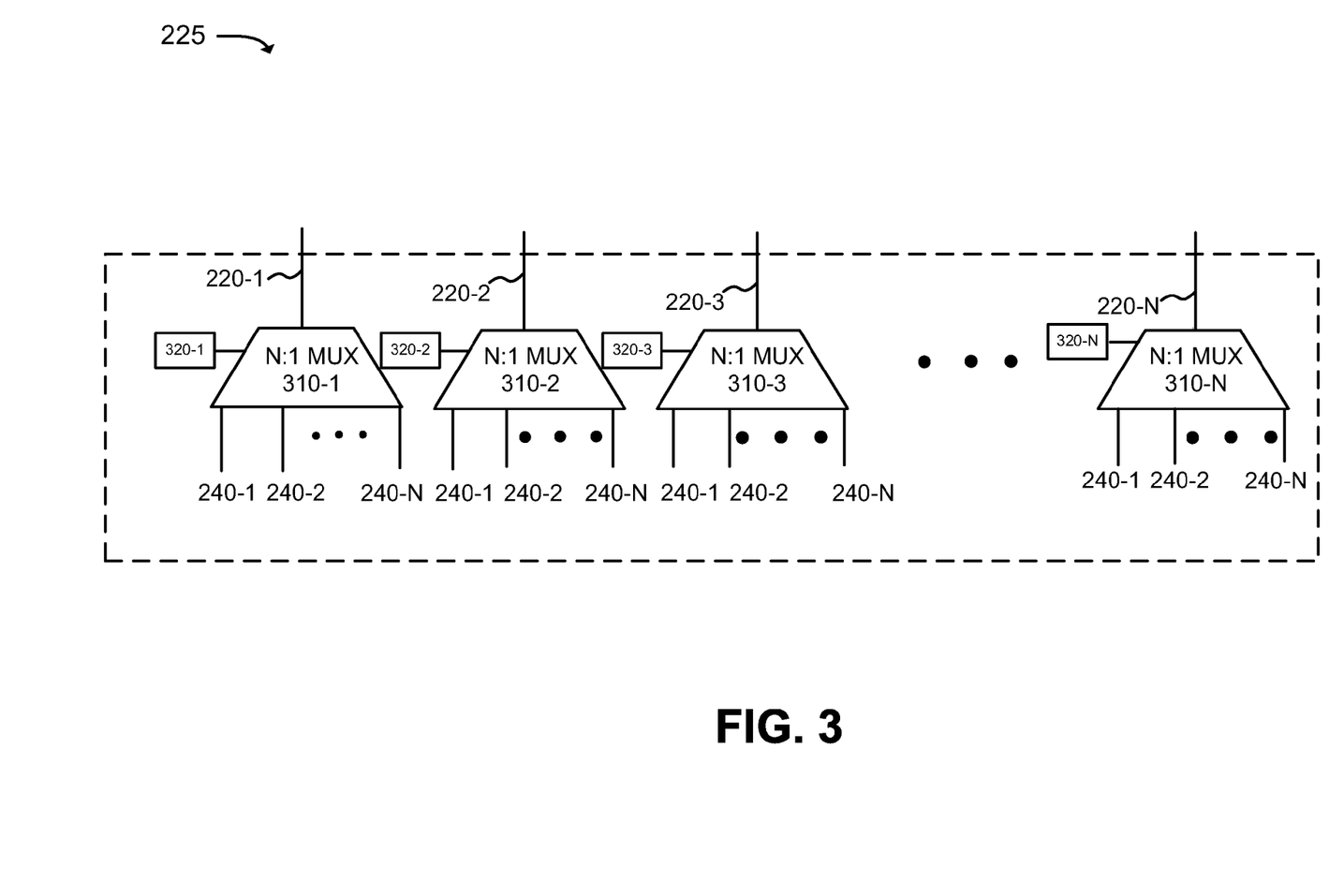
FIG. 3 is a diagram of an allocation register shown in FIG. 2.

FIG. 3 is a diagram of allocation register 225. Allocation register 225 may include multiplexers 310-1, 310-2, 310-3, . . . , 310-N (referred to collectively as "multiplexers 310" and individually as "multiplexer 310"). Each one of multiplexers 310 may correspond to one of pads 220. For example, multiplexer 310-1 may correspond to pad 220-1, multiplexer 310-2 may correspond to pad 220-2, multiplexer 310-3 may correspond to pad 220-3, multiplexer 310-4 may correspond to pad 220-4, etc. Allocation register 225 may receive a layout of a board that includes memory device 110. Allocation register 225 may program registers to allocate which signal each one of pads 220 may transmit. Allocation register 225 may store the values of the registers in an allocation table. Allocation register 225 may use values of the registers, by retrieving the values from the allocation table, as selector inputs 320-1, 320-2, 320-3, . . . , 320-N (referred to collectively as "selector inputs 310" and individually as "selector input 320"). Each one of multiplexers 310 may receive a different one of selector inputs 310. A selector input 310 may correspond to pad 220 associated with a particular multiplexer 310 that receives selector input 310. Also, each one of multiplexers 310 may receive each one of input signals 240.

For example, in one implementation, memory controller 120 may include 26 control pads 220 (i.e., N=26) for 26 control pins. Allocation register 225 may include 26 multiplexers 310 that correspond to the 26 control pads 220. Allocation register 225 may use 5-bit registers to store a value for each one of control pads 220. Allocation register 225 may assign a value between 0 and 25 (inclusive of 0 and 25) to each one of the registers. Allocation register 225 may assign a particular value (e.g., 3) to only one of the registers (e.g., a register corresponding to control pad 220-1).

In a further example, allocation register 225 may assign a value of "3" to a register corresponding to pad 220-1, a value of "2" to a register corresponding to pad 220-2, a value of "1" corresponding to pad 220-3, etc. Each one of multiplexers 310 may receive 26 control signals as input signals 240-1 through 240-26. Multiplexer 310-1 may receive the value of "3" as selector input 320-1. Based on selector input 320-1, multiplexer 310-1 may select to output input signal 240-4 (e.g., WE signal) out of pad 220-1. Multiplexer 310-2 may receive the value of "2" as selector input 320-2. Based on selector input 320-2, multiplexer 310-2 may select to output input signal 240-3 (e.g., CAS signal) out of pad 220-2. Multiplexer 310-3 may receive the value of "1" as selector input 320-3. Based on selector input 320-3, multiplexer 310-3 may select to output input signal 240-2 (e.g., RAS signal) out of pad 220-3. Pins 210-1 through 210-26 may receive input signals 240 from pads 220-1 through 220-26, respectively.

Figure 4:
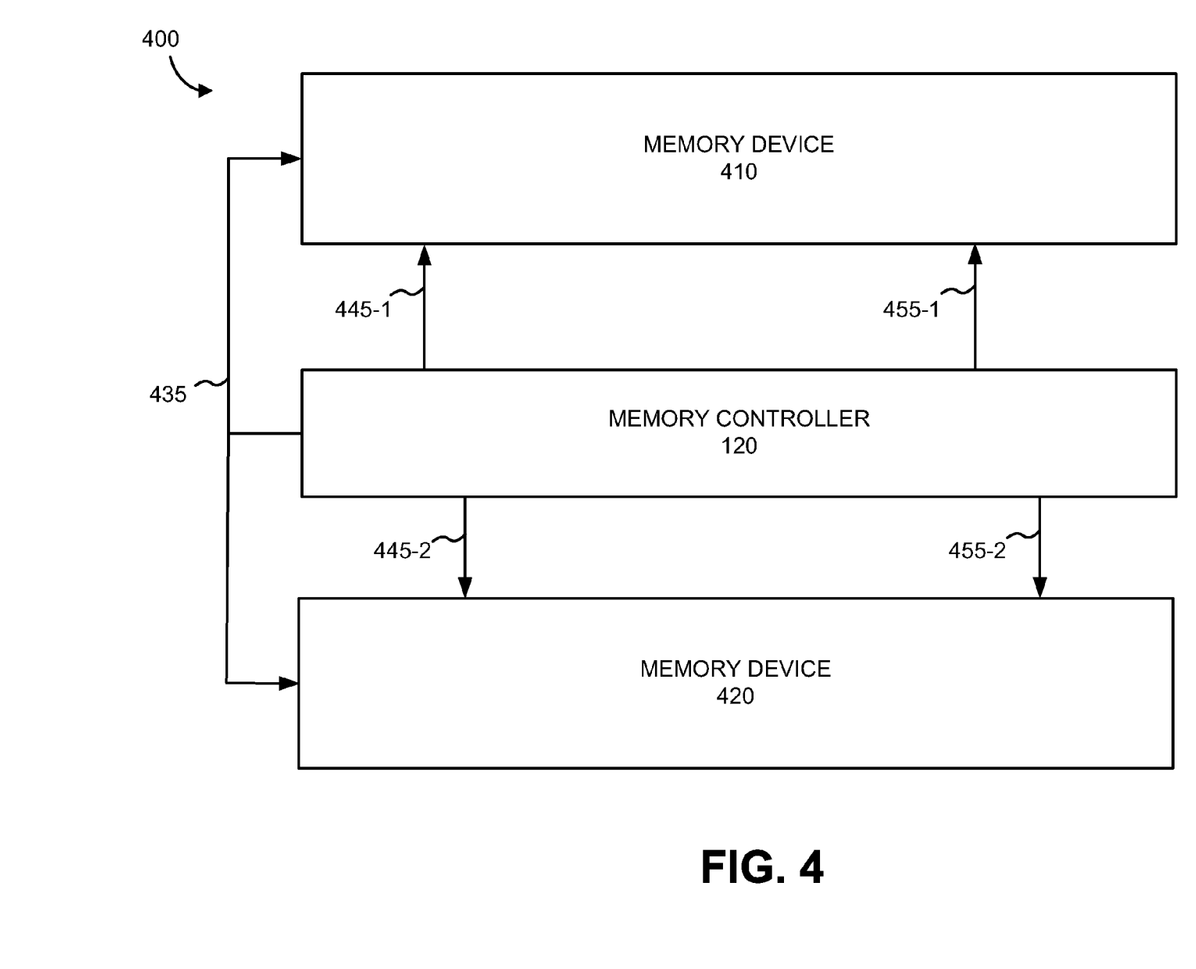
FIG. 4 is a diagram of an example system according to another implementation described herein.

FIG. 4 is a diagram of an example system 400 according to another implementation described herein. System 400 may include memory controller 120, memory device 410, and memory device 420. Memory controller 120 may read and write data to or from memory device 410 and memory device 420 and generally control the operation of memory device 410 and memory device 420. System 400 may include a shared control bus 435. Memory controller 120 may use shared control bus 235 to send control signals from pads 220 of memory controller 120 to corresponding pins 210 of both memory device 410 and memory device 420. System 400 may also include CS lines 445-1 and 445-2 and ODT lines 455-1 and 455-2. (Herein, any reference to particular types of signals and/or lines is for example purposes only. In other implementations, different types of signals and lines may be used instead of the types used in the examples herein. For example, CS lines 445-1 and 445-2 may be Reset lines 445-1 and 445-2 in another implementation.) For the example used here, memory controller 120 may use line 445-1 to transmit a first CS signal from pad 220 to pin 210 of memory device 410 that is configured to receive a CS signal. Memory controller 120 may use line 445-2 to transmit a second, different (independent), CS signal from a different pad 220 to pin 210 of memory device 420 that is configured to receive a CS signal. Similarly, memory controller 120 may use line 455-1 to transmit a first ODT signal from pad 220 to pin 210 of memory device 410 that is configured to receive an ODT signal. Memory controller 120 may use line 455-2 to transmit a second, different (independent), ODT signal from a different pad 220 to pin 210 of memory device 420 that is configured to receive an ODT signal.

Memory controller 120 may include control pads 220 that are segregated into two separate groups. Memory controller 120 may flexibly allocate the pads within each group to transmit different control signals. For example, a first group may include control pads 220-1 through 220-22. Memory controller 120 may allocate each one of control pads 220-1 through 220-22 in the first group to a signal for one of an address, a bank, an RAS signal, a CAS signal, and a WE signal. A second group may include control pads 220-23 through 220-26. For example, memory controller 120 may allocate each one of control pads 220-23 through 220-26 in the second group to a signal for one of an ODT signal, a CS signal, a clock enable signal, and a reset signal. Pins 210 of memory device 410 or memory device 420 may receive control signals from pads 220 of the first group only after receiving the CS signal. As a result, memory controller 120 may allocate any one control pad 220 of the first group to send different signals to memory device 410 and memory device 420. For example, pad 220-1 may physically connect to an RAS pin 210 (a pin configured to receive an RAS signal) of memory device 410/420 and to a CAS pin 210 (a pin configured to receive a CAS signal) of memory device 410/420.

Figure 5:
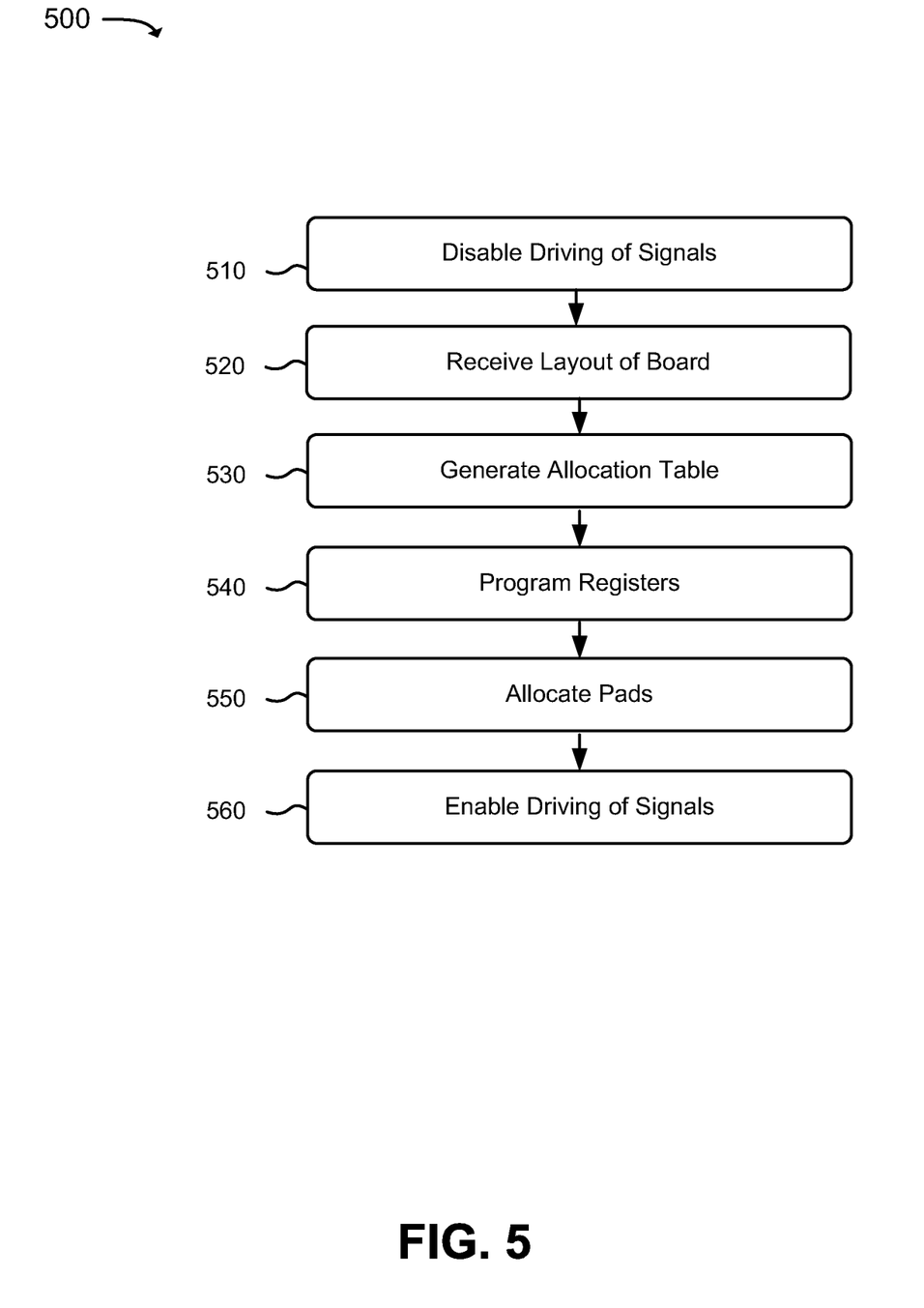
FIG. 5 is a flowchart of an example process for flexible pin allocation.

FIG. 5 is a flowchart of an example process 500 for flexible pin allocation. Process 300 will be described with reference to FIGS. 1-3. In one implementation, memory controller 120 may perform process 500. In another implementation, some or all of process 550 may be performed by a device separate from or in combination with controller 120.

As shown in FIG. 5, process 500 may include disabling driving of signals (block 510). For example, memory device 110 may receive instructions from memory controller 120 (e.g., in a form of a reset signal) and/or another device to power-up or reset memory device 110. After powering-up or resetting memory device 110, memory controller 120 may need to allocate pads 220 of memory controller 120 before pins 210 of memory device 110 may receive one or more signals from pads 220. As a result, memory controller 120 may disable driving of signals from one or more pads 220 (e.g., control and data pads) until the pads 220 are allocated.

A layout of a board may be received (block 520). For example, memory controller 120 may receive a layout of a board. The layout of the board may include information about the configuration of pins 210 of memory device 110. In one implementation, memory controller 120 may receive information about the layout in the form of a type (e.g., "X1") of the board. Memory controller 120 may determine the layout of the board (or just information necessary to generate an allocation table, as described further below) based on the type. In another implementation, memory controller 120 may receive the information about the board layout from operator input.

An allocation table may be generated (block 530). For example, memory controller 120 may determine, based on the layout of the board and/or the received type of the board, how to generate the allocation table. Memory controller 120 may generate the allocation table to store information necessary for the allocation of pads 220. In another implementation, memory controller 120 may generate separate allocation tables for different groups of pads 220. For example, memory controller 120 may generate a first allocation table for pads 220 (control pads 220) that are grouped to transmit control signals, a second allocation table for pads 220 (data mask pads 220) that are grouped to transmit data mask signals, and a third allocation table for pads 220 (data pads 220) that are grouped to transmit data signals. In one implementation, memory controller 120 may not store information for pads 220 that transmit strobe and clock signals in an allocation table because pads 220 that are reserved for strobe and clock signals are fixed. In other words, in this implementation, the strobe and clock pads are restricted from flexible pin allocation.

For example, an allocation table may include information about one or more of pins 210 of memory device 110, pads 220 of memory controller 120, or input signals 240. The allocation table for control pads 220 (pads 220 that are grouped together for control signals) and/or data mask pads 220 (pads 220 that are grouped together for data mask signals) may facilitate the rerouting of input signal 240 to a particular pad 220 that corresponds (is physically, directly, connected) to pin 240 that is configured to receive a type of the signal. Table 1, below, is a representation of a part of an example of the allocation table for control pads 220:

TABLE 1

| Pin | Pad | Signal |
| --- | --- | --- |
| Pin 210-1 (WE pin) | Pad 220-1 | Input Signal 240-4 (WE signal) |
| Pin 210-2 (CAS pin) | Pad 220-2 | Input Signal 240-3 (CAS signal) |

TABLE 1-continued

| Pin | Pad | Signal |
|---|---|---|
| Pin 210-3 (RAS pin) | Pad 220-3 | Input Signal 240-2 (RAS signal) |
| Pin 210-4 (CS pin) | Pad 220-4 | Input Signal 240-1 (CS signal) |
| ... | ... | ... |

Based on the allocation table, memory controller 120 may allocate each control pad 220 to a different one of control signals 240. Similarly, memory controller 120 may allocate each data mask pad 220 to a different one of data mask signals 240. Memory controller 120 may redirect control signals 240 and data mask signals 240 to output out of a pad 220 allocated for a particular signal 240 in the allocation table.

Memory controller 120 may also generate an allocation table for data pads 240 that are grouped to transmit data signals. For example, memory controller 120 may receive data input signals 240 in the following order: DQ0 as input signal 240-1, DQ1 as input signal 240-2, DQ2 as input signal 240-3, and DQ3 as input signal 240-4. Memory device 110 may include pin 210-1 that is configured to receive a DQ3 signal, pin 210-2 that is configured to receive a DQ2, pin 210-3 that is configured to receive a DQ1 signal, and pin 210-4 that is configured to receive a DQ0 signal. Memory controller 120 may not need to redirect data signals, within memory controller 120, because memory controller 120 may write (store) data in any order if the data is then read from memory controller 120 in the same order. Accordingly, memory controller 120 may generate an allocation table that maintains the order of the data signals and specifies for the data signals to be simply transmitted by data pads 220 to corresponding data pins 210 that are directly across from the data pads 220. For example, Table 2, below, is a representation of a part of an example of the allocation table for data pads 220:

TABLE 2

| Pin | Pad | Signal |
|---|---|---|
| Pin 210-1 (DQ3 pin) | Pad 220-1 | Input Signal 240-1 (DQ0 signal) |
| Pin 210-2 (DQ2 pin) | Pad 220-2 | Input Signal 240-2 (DQ1 signal) |
| Pin 210-3 (DQ1 pin) | Pad 220-3 | Input Signal 240-3 (DQ2 signal) |
| Pin 210-4 (DQ0 pin) | Pad 220-4 | Input Signal 240-4 (DQ3 signal) |
| ... | ... | ... |

Based on Table 2, pad 220-1 may transmit data input signal 240-1, DQ0, to pin 210-1 even though pin 210-1 is configured to receive DQ3. Pad 220-2 may transmit data input signal 240-2, DQ1, to pin 210-2 even though pin 210-2 is configured to receive DQ2. Pad 220-3 may transmit data input signal 240-3, DQ2, to pin 210-3 even though pin 210-3 is configured to receive DQ1. Pad 220-4 may transmit data input signal 240-4, DQ3, to pin 210-4 even though pin 210-4 is configured to receive DQ0. As a result, for example, input signal 240-1 does not need to be redirected for pad 220-4 to transmit input signal 240-1 to pin 210-4.

Registers may be programmed (block 540). For example, an allocation table for control pads 220 or data mask pads 220 may also include values of registers that correspond to pads 220. Memory controller 120 may calculate values of the registers based on the information in the allocation table. Memory controller 120 may calculate a value of a particular register corresponding to pad 220 based on what particular input signal 210 is allocated to pad 220. Memory controller 120 may program the registers based on the calculated values. For example, Table 1 above shows that pad 220-1 is allocated to output input signal 240-4. For the allocation to take place properly, multiplexer 310-1 may need to receive a value of "3" as selector input 320-1. Memory controller 120 may use, for selector input 320-1, a value of a register stored for pad 220-1 that corresponds to multiplexer 310-1. Table 3, below, illustrates an example of Table 1 that is modified to include a representation of values of registers corresponding to control pads 220:

TABLE 3

| Pin | Pad | Signal | Register Value |
|---|---|---|---|
| Pin 210-1 (WE pin) | Pad 220-1 | Input Signal 240-4 (WE signal) | 3 |
| Pin 210-2 (CAS pin) | Pad 220-2 | Input Signal 240-3 (CAS signal) | 2 |
| Pin 210-3 (RAS pin) | Pad 220-3 | Input Signal 240-2 (RAS signal) | 1 |
| Pin 210-4 (CS pin) | Pad 220-4 | Input Signal 240-1 (CS signal) | 0 |
| ... | ... | ... | |

Similarly, memory controller 120 may program registers for data mask pads 220. However, memory controller 120 may not need to program registers for data pads 220 because data input signals 240 do not need to be redirected to different data pads 220 by using multiplexers 310. As a result, registers are not necessary for selector inputs 320.

Pads 220 may be allocated (block 550). For example, memory controller 120 may include pads 220-1 through 220-26 as control pads 220. Each one of multiplexers 310-1 through 310-26, corresponding to control pads 220, may receive each one of control input signals 240-1 through 240-26. Memory controller 220 may retrieve a value of a register corresponding to control pad 220 for selector input 320 of multiplexer 310 that corresponds to control pad 220. For example, multiplexer 310-1 may correspond to pad 220-1. Multiplexer 310-1 may receive control input signals 240-1 through 240-26. Memory controller 220 may retrieve a value of "3," which is the value of a register programmed for control pad 220-1, for selector input 320-1 of multiplexer 310-1. Multiplexer 310-1 may select control signal 240-4 based on the value of "3" of selector input 320-1. Memory controller 220 may allocate pad 220-1 to output control signal 240-4 by outputting control signal 240-4 from multiplexer 310-1. Memory controller 120 may allocate data mask pads 220 in a similar manner.

As discussed above, memory controller 120 may not need to use multiplexers 310 or selector inputs 320 to allocate data pads 120 for data input signals 240. For example, memory controller 120 may receive data signal DQ0 as data input signal 240-1. Memory controller 120 may output data input signal 240-1 out of data pad 220-1 even though data pin 210-1, which is physically directly across from data pad 220-1, is configured to receive data signal DQ3. Memory controller 120 may not need to internally redirect data input signals 240 to a particular one of data pads 220 because what specific data signal a data pin 210 is configured to receive is irrelevant. As discussed above, what specific data signal a data pin 210 is configured to receive may be irrelevant because any data pin 210 may receive any one of a plurality of data signals as long as the plurality of data signals are written to memory device 110 in the same order as the plurality of data signals are later read from memory device 110. Data pin 210-1 may receive data signal DQ0 from data pad 220-1. In other words, data pads 220 may not need to be allocated based on the configuration of data pins 210.

Driving of control signals and data signals may be enabled (block 560). For example, after memory controller 120 allocates pads 220 to transmit particular control signals, data mask signals, and data signals, as discussed above, memory controller 120 may enable driving (transmitting) of control signals and data signals via the allocated pads 220. Memory controller 120 may drive control signals and data mask signals by using multiplexers 310 and selector inputs 320. Memory controller 120 may drive data input signals 240 in an order of data pads 220 without redirecting data input signals 240 within memory controller 120.

In another implementation, before beginning and during process 500, memory controller 120 may need to conduct write leveling. Write leveling may allow memory controller 120 to de-skew a relationship between when strobe signals (e.g., DQS) and clock signals (e.g., CK) are received (e.g., compensate for the additional time to receive DQS in comparison to CK) by memory device 110. Memory controller 120 may conduct the write leveling based on write leveling feedback provided by memory device 110. To allow flexible pin allocation of pads 220 of memory controller 120, memory device 110 may generate the write leveling feedback by ORing all of the DQ pins. Memory controller 120 may receive the write leveling feedback from memory device 110 and conduct the write leveling based on the ORing of the DQ pins.

In yet another implementation, before beginning and during process 500, memory controller 120 may need to conduct read training. Read training may allow memory controller 120 to adjust for delays introduced by reading of data by memory device 110. Memory controller 120 may conduct the read training based on calibration read information provided by memory device 110. To allow flexible pin allocation of pads 220 of memory controller 120, memory controller 120 may conduct read timing calibration based only on the prime DQs (prime DQ=DQ0).

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    sending, by a memory controller of a device, a first chip select signal from the memory controller to a first memory device of the device;
    sending, by the memory controller and after sending the first chip select signal, a first signal from a first pad of the memory controller to a first pin of the first memory device,
        the memory controller including the first pad and one or more other pads;
    sending a second chip select signal from the memory controller to a second memory device of the device; and
    sending, by the memory controller and after sending the second chip select signal, a second signal from the first pad to a second pin of the second memory device,
        the first memory device being different from the second memory device, and
        the memory controller being implemented at least partially in hardware.

2. The method of claim 1,
    where the first signal is a Row Address Strobe signal, and
    where the second signal is a Column Address Strobe signal.

3. The method of claim 1, where the first pad of the memory controller physically connects to the first pin of the first memory device and to the second pin of the second memory device.

4. The method of claim 1, further comprising:
    programming a register corresponding to the first pad of the memory controller based on the information regarding the first pin of the first memory device,
        the register causing the first signal to be transmitted from the first pad to the first pin of the first memory device.

5. The method of claim 4, where programming the register comprises:
    generating a data structure based on the information regarding the first pin, and
    programming the register based on the data structure.

6. The method of claim 1,
    transmitting an instruction, to the first memory device, to power-up or reset the first memory device; and
    disabling driving of new signals to the first memory device based on the instruction.

7. The method of claim 1,
    determining whether an allocation of the first pad and the one or more other pads is complete; and
    enabling driving of new signals to the first memory device after determining that the allocation is complete.

8. A non-transitory computer-readable medium storing instructions, the instructions comprising:
    one or more instructions that, when executed by a device, cause the device to:
        send a first chip select signal from a memory controller, of the device, to a first memory device of the device,
        send, after sending the first chip select signal, a first signal from a first pad to a first pin of the first memory device,
            the memory controller including the first pad and one or more other pads;
        send a second chip select signal from the memory controller to a second memory device of the device; and
        send, after sending the second chip select signal, a second signal from the first pad to a second pin of the second memory device, the first memory device being different from the second memory device.

9. The non-transitory computer-readable medium of claim 8, where the first pad of the memory controller physically connects to the first pin of the first memory device and to the second pin of the second memory device.

10. The non-transitory computer-readable medium of claim 8,
where the first signal is of a Row Address Strobe signal type, and
where the second signal is of a Column Address Strobe signal type.

11. The non-transitory computer-readable medium of claim 8, where the one or more instructions to send the first signal comprise:
one or more instructions that, when executed by the device, cause the device to:
program a register corresponding to the first pad of the memory controller based on information regarding the first pin of the first memory device,
the register causing the first signal to be transmitted from the first pad to the first pin of the first memory device.

12. The non-transitory computer-readable medium of claim 11, where the one or more instructions to send the first signal comprise:
one or more instructions that, when executed by the device, cause the device to:
send the first signal from the first pad to the first pin based on a value of the register.

13. The non-transitory computer-readable medium of claim 8, where the one or more instructions to send the first signal comprise:
one or more instructions that, when executed by the device, cause the device to:
transmit an instruction, to the first memory device, to power-up or reset the first memory device,
determine, based on the register being programmed, that an allocation of the first pad and the one or more other pads is complete, and
send the first signal to the first memory device after determining that the allocation is complete.

14. A device comprising:
a first memory device comprising a first pin;
a second memory device comprising a second pin,
the second memory device being different from the first memory device; and
a memory controller comprising:
a first pad, and
one or more other pads,
the memory controller being to:
send a first chip select signal from the memory controller to the first memory device,
send, after sending the first chip select signal, a first signal from the first pad to the first pin,
send a second chip select signal from the memory controller to the second memory device, and
send, after sending the second chip select signal, a second signal from the first pad to the second pin.

15. The device of claim 14,
where the first signal is of a Row Address Strobe signal type, and
where the second signal is of a Column Address Strobe signal type.

16. The device of claim 14,
where the first memory device further comprises a third pin,
where the second memory device further comprises a fourth pin, and
where the memory controller is further to:
send a third signal to the third pin, and
send a fourth signal to the fourth pin,
the first signal being of a first type,
the second signal being of a second type, and
at least one of the third signal or the fourth signal being of a third type that is different from the first type and the second type.

17. The device of claim 14, where the first pad is connected to the first pin via a connection that does not crossover any other connection of the one or more other pads and another pin of the first memory device.

18. The device of claim 14, where the memory controller is to:
receive, information regarding a configuration of the first pin and one or more other pins of the first memory device,
the information regarding the configuration including information regarding the first pin, and
allocate the first pad to transmit the first signal to the first pin, and the one or more pads to transmit one or more other signals to the one or more other pins based on the information regarding the configuration.

19. The method of claim 4, further comprising:
receiving, by the memory controller and before programming the register, the information regarding the first pin of the first memory device.

20. The non-transitory computer-readable medium of claim 11, the instructions further comprising:
one or more instructions that, when executed by the device, cause the device to:
receive the information regarding the first pin of the first memory device before programming the register.

* * * * *